Aug. 26, 1958  G. J. PASKER  2,849,255
HOIST MECHANISM FOR DUMP TRUCKS
Filed Aug. 16, 1955  5 Sheets-Sheet 1

INVENTOR.
GERALD J. PASKER
BY
ATTORNEY

Aug. 26, 1958   G. J. PASKER   2,849,255
HOIST MECHANISM FOR DUMP TRUCKS
Filed Aug. 16, 1955   5 Sheets-Sheet 2

INVENTOR.
GERALD J. PASKER
BY
ATTORNEY

Aug. 26, 1958     G. J. PASKER     2,849,255
HOIST MECHANISM FOR DUMP TRUCKS
Filed Aug. 16, 1955     5 Sheets-Sheet 3

INVENTOR.
GERALD J. PASKER
BY
ATTORNEY

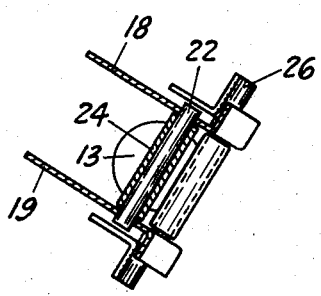
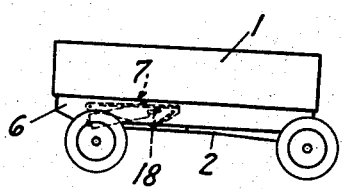
Fig. 7  Fig. 10
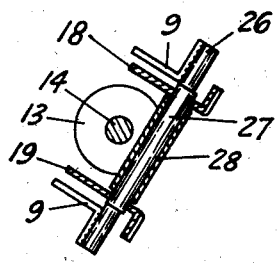
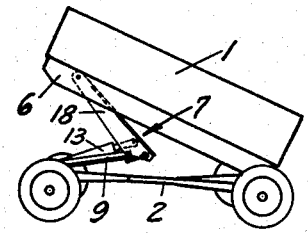
Fig. 8  Fig. 11
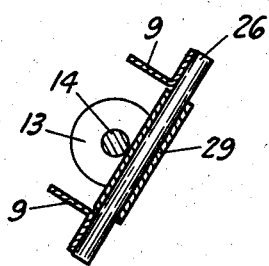
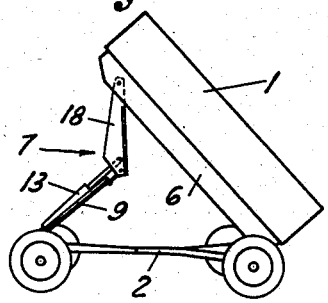
Fig. 9  Fig. 12
INVENTOR.
GERALD J. PASKER
BY
ATTORNEY

2,849,255
HOIST MECHANISM FOR DUMP TRUCKS

Gerald J. Pasker, Monticello, Iowa

Application August 16, 1955, Serial No. 528,652

6 Claims. (Cl. 298—22)

This invention relates to a hoist or lift such as is useful in the tilting of dump bodies on vehicles. More particularly, the invention relates to a hoist in which the speed of lift increases in proportion to the decrease in load as the dump body is tilted.

The invention finds practical utility in a tilting body for farm wagons and the like, in which the power medium is a fluid motor deriving fluid pressure from a tractor or the like having a built in hydraulic system that is limited in capacity as to both volume and pressure.

Because of these limitations it is often impossible to attain a maximum height of lift consistent with the power requirements for dumping average loads. According to the present invention these disadvantages are eliminated by a novel and compact hoist or lift that utilizes changing fulcra positioned so as to obtain an increase in lifting speed, which is in proportion to the decrease in power required to tilt the box as the front of box is being raised. The above action utilizes with maximum efficiency the pressure and volume of fluid available. The invention features a compact organization of parts in which the various components of the hoist occupy a minimum of space, yet are economically and conveniently assembled into a sturdy unit that may be readily attached to virtually any type of vehicle, particularly vehicles of the farm wagon type.

The foregoing and other important objects and desirable features inherent in and encompassed by the invention will become apparent as a preferred embodiment of the invention is disclosed in detail in the following specification and accompanying sheets of drawings, the several figures of which are described immediately below.

Figure 6:
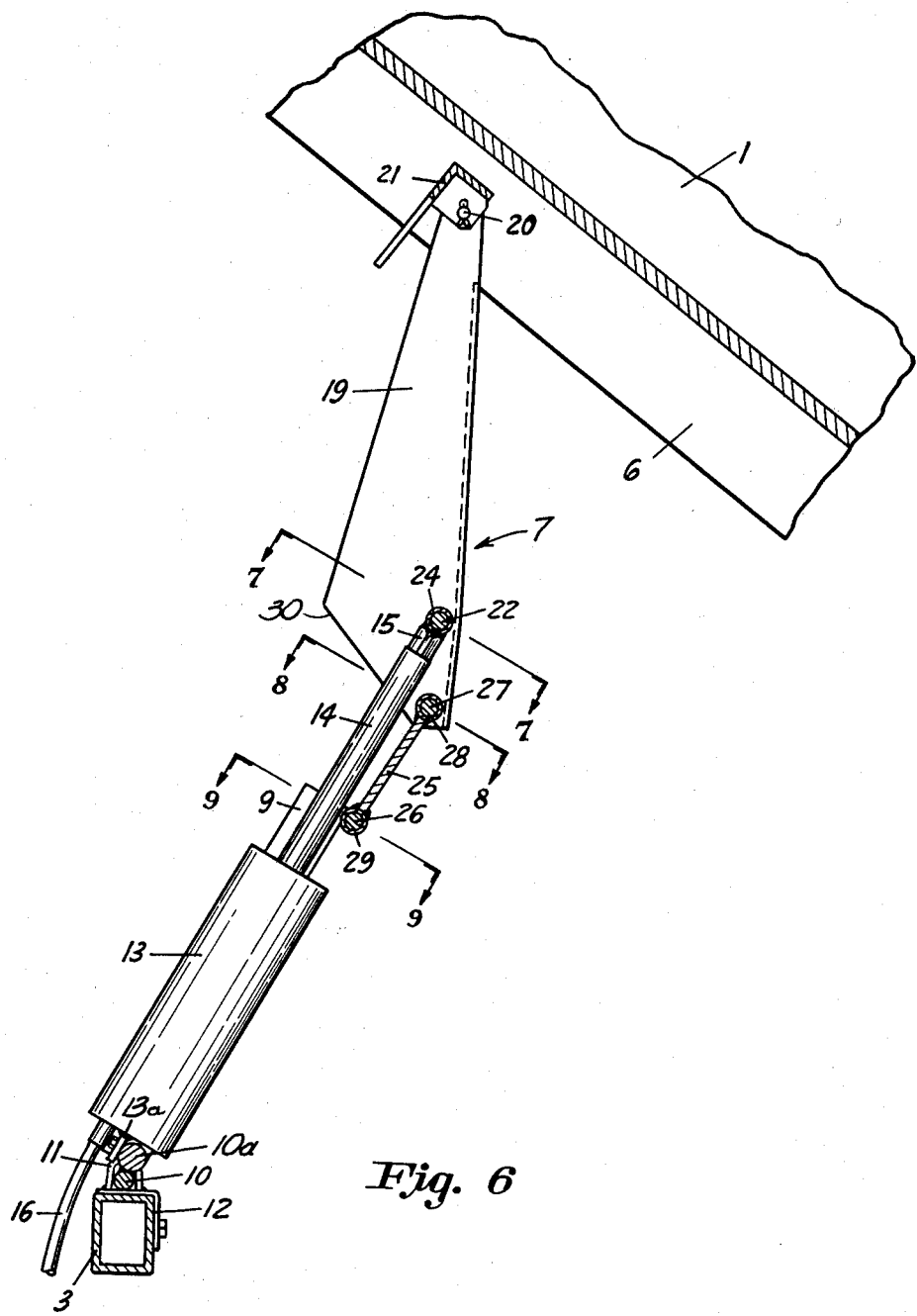
Figure 6 is a section showing the hoist at completion of its lifting action.

Figures 7, 8 and 9 are sections, respectively, on the lines 7—7, 8—8 and 9—9 of Figure 6.

Figure 1:
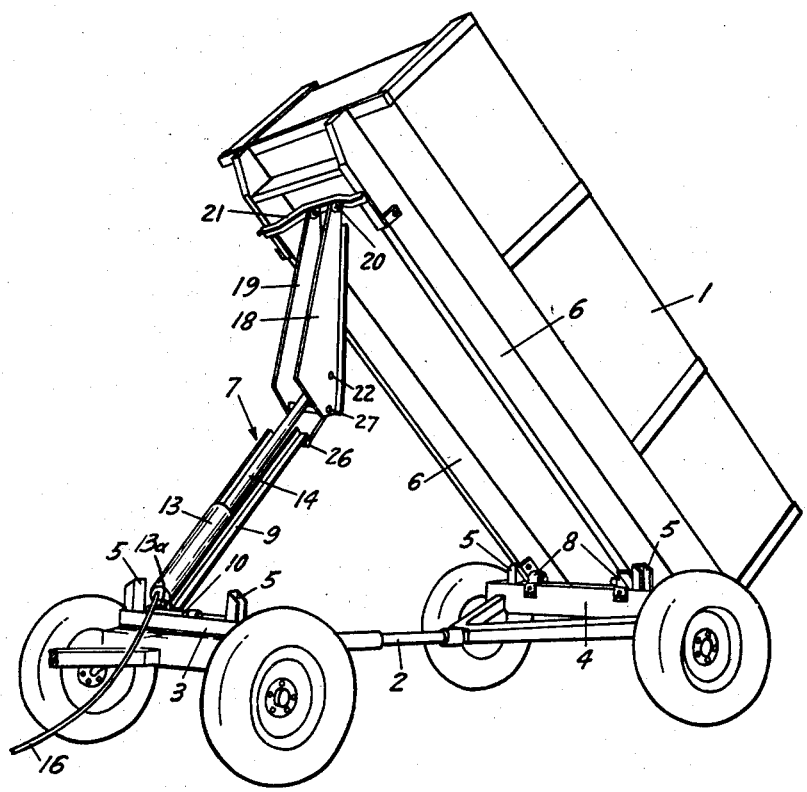
Figure 1 is a perspective showing a farm wagon with its body tilted by subject hoist.
Figure 2:
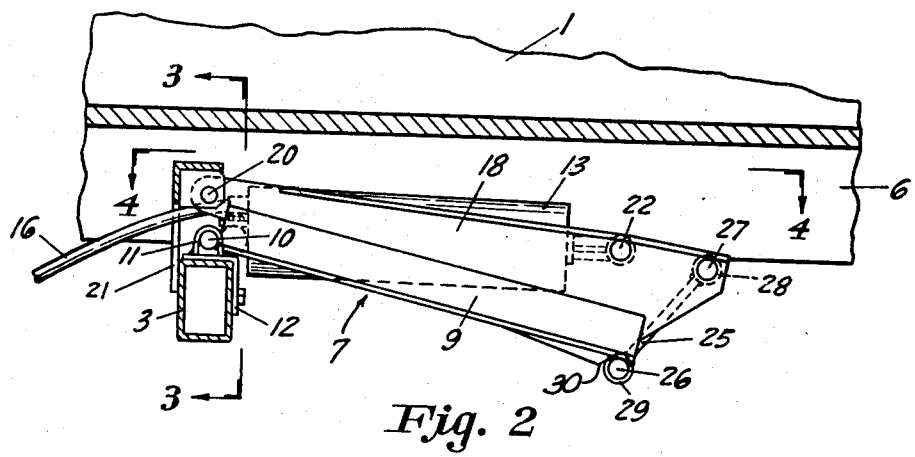
Figure 2 is a fragmentary longitudinal section, on an enlarged scale, showing the hoist in its fully lowered position.
Figure 4:
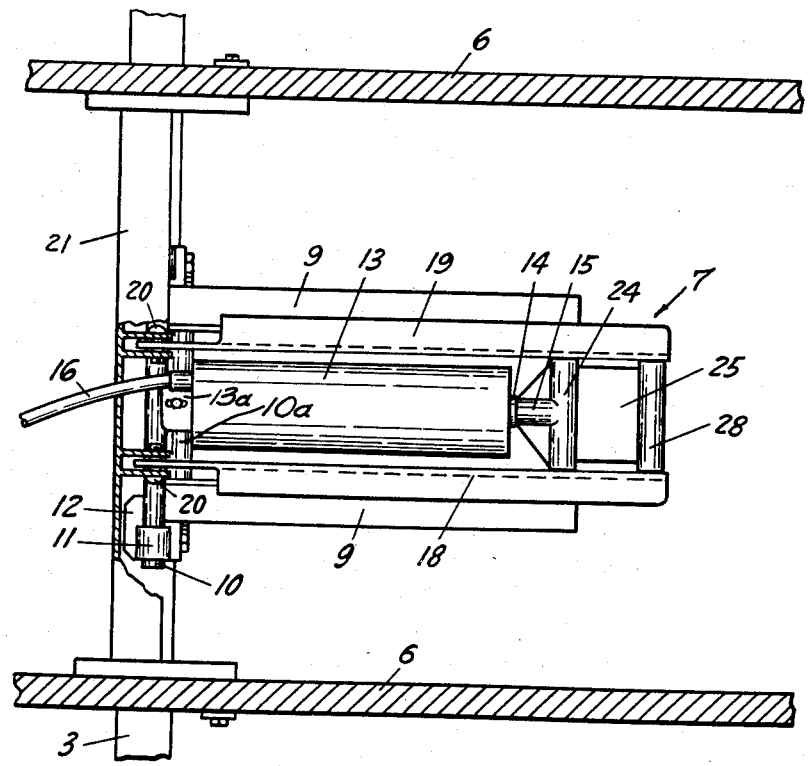
Figure 4 is a section as seen on the line 4—4 of Figure 2.
Figure 5:
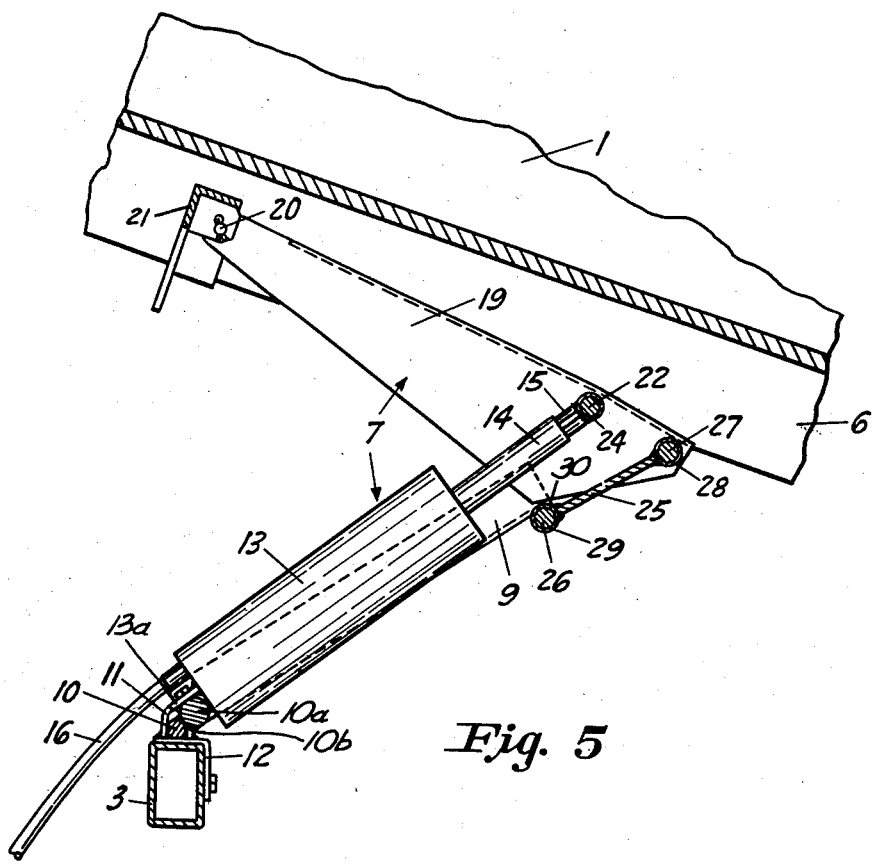
Figure 5 is a section showing the hoist in approximately a half raised position.

Figures 10, 11 and 12 are reduced-scale views showing the position of the body of the vehicle corresponding respectively with the positions of Figures 2, 5 and 6.

Figure 3:
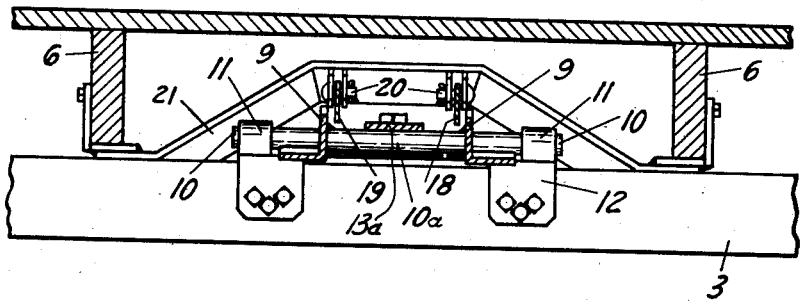
Figure 3 is a section as seen on the line 3—3 of Figure 2.

The vehicle chosen for purposes of illustration is a typical farm wagon having a wagon box 1 supported on a wheeled chassis or frame 2 which has a front bolster 3 and a rear bolster 4, each bolster having stakes 5 for accommodating transversely spaced apart fore-and-aft frame members 6 secured to the bottom of the body, when the body is in its lowered position (Figures 2, 3 and 10).

The novel hoist is designated in its entirety by the numeral 7. The body 1 is pivoted to the rear bolster, as by a pivot 8 on a transverse axis. The hoist includes a pair of transversely spaced fore-and-aft extending bars 9 which are connected at their forward ends to the front bolster 3 by a transverse pivot member 10. The mounting for the pivot member 10 is accomplished by a pair of transversely alined member-receiving bearings 11 carried by a bracket 12 that is bolted or otherwise secured to the bolster 3.

The hoist is powered by a force-exerting device, here in the form of a fluid motor 13, the closed end of the cylinder of which carries a bracket 13a that is bolted or otherwise secured to a transverse support 10a which is in turn welded or otherwise rigidly affixed to the pivot member 10 as at 10b. The length of the support 10a is such that its opposite ends lie laterally inwardly of the respective bearings 11. The motor has a piston rod 14 to the free end of which is connected a connector 15. Fluid under pressure is supplied to the motor via a hose 16 from any suitable source. Conventionally, this source would be the hydraulic system of a tractor or similar vehicle that tows the wagon or trailer.

The bottom of the body 1 carries a pair of transversely spaced apart fore-and-aft extending lift plates or arms 18 and 19, the forward ends of which are pivotally connected on a transverse axis at 20 to the bottom of the body by means of a cross member 21 that is secured to the fore-and-aft members 6. A cross pin 22 spans and is secured to the arms 18 and 19 adjacent to the rear ends thereof and this pin is received by a sleeve 24 that forms part of the connector 15. This connector is of T-shape, of which the sleeve 24 forms the bar and a fore-and-aft sleeve portion is received by the free end of the piston rod 14.

The rear ends of the bars 9 are connected to the extreme rear ends of the arms 18 and 19 by a link 25 and first and second pivot shafts 26 and 27. The connection is effected by means of transverse sleeves 28 and 29 at opposite ends of the link 25. Integration of the link and sleeves may be effected by welding. The sleeve 28 journally receives the pivot shaft 27 and the sleeve 29 obtains a similar result as to the pivot shaft 26. The length of the sleeve 28 is substantially equal to the transverse spacing between the arms 18 and 19, the sleeve thereby serving as a spacer. The length of the sleeve 29 is substantially equal to the transverse spacing between the bars 9, thereby constraining the bars and link against relative lateral displacement, all of which lends to the compactness and economical construction of the hoist.

As best seen in Figure 2, the bars 9 are beneath the bottom of the body 1 and may be considered to extend generally horizontally rearwardly from the pivot 10. The link 25 extends upwardly and rearwardly so that the pivotal connection at 27 is above and to the rear of the pivot at 26. The pivotal connection at 22 between the piston rod 14 and the arms 18 and 19 is ahead of the pivot shaft 27 and above the pivot shaft 26. The configuration of the arms 18 and 19 is such that each has an undersurface 30 engageable at times with the cross pivot shaft 26. The transverse spacing between the bars 9 is greater than that between the arms 18 and 19 so that the latter are at least in part nested between the former; yet, the spacing between the arms 18 and 19 is sufficient to receive the fluid motor 13 lengthwise therebetween, which is another factor lending compactness and simplicity to the hoist.

Operation

Let it be assumed that the body is in the position of Figures 2 and 10 and that fluid under pressure is supplied to the motor 13, which results in extension of the motor so that the piston rod 14 moves rearwardly, thrusting against the cross pin 22 and thereby tending to rock the arms 18 upwardly, which results in tilting of the body 1 about its pivot 8 to the frame 2. During extension of the motor 13 from Figure 2 to Figure 5, the fulcrum of the arms 18 and 19 is the pivot shaft 26. In other words, as best seen in Figure 2, there is a triangular relationship between the points 10, 22 and 26, the bars 9 and the link 25 forming a toggle which is straightened by extension of the motor to the extent indicated in Figure 5. When the parts reach their respective positions as shown in Figure 5, the points 10, 26 and 27 are in a straight line and the bars 9 and link 25 are therefore in tension. Therefore, further extension of the motor causes the exertion of force on the cross pin 22 to pivot the arms 18 and 19 about the pivot shaft 27 as a fulcrum, whereby the mechanism attains the position of Figure 6.

In the movement of the hoist from Figure 2 to Figure 5, there is a moment arm sufficient to transmit maximum power so as to lift the load in the body 1 to the position of Figure 11. It will be obvious that when the body reaches the position of Figure 11 the load on the hoist has decreased. Therefore, the force required to tilt the body from Figure 11 to Figure 12 is less than that required to tilt the body from Figure 10 to Figure 11. According to the present invention this circumstance is taken advantage of so as to increase the speed of lift, because the moment arm then required need not be as great as it was previously. Stated otherwise, the fulcrum shifts from the pivot shaft 26 to the pivot shaft 27. This is significant on the basis of the capacity of the hydraulic system supplying the motor 13. For example, with a plain lift, the volume of fluid available to extend the motor can raise the body 1 to a certain height. If the leverages designed into the system are such as to utilize most of this volume for tilting the body from Figure 10 to Figure 11, then there is not much left to tilt the body further. However, if the leverages are designed, as they are here, to change in accordance with the power requirements, a greater height of lift can be obtained.

As the body is lowered from the position of Figures 6 and 12, the motor 13 contracts. The first range of pivoting occurs about the pivot shaft 27, the bars 9 and the link 25 remaining in tension. As the arms 18 and 19 approach the position of Figure 5, the undersurfaces 30 engage the pivot shaft 26 to prevent upward buckling of the toggle between the link 25 and bars 9. Therefore, the pivot shaft 26 is caused to move downwardly as it becomes the fulcrum and the cross pin 22 then pivots about the pivot shaft 26 until the body and hoist attain their positions of Figures 2 and 10.

It will be noted in Figure 6 that the maximum stroke of the motor has been utilized; yet, the pivot shaft 26 is still short of contacting the piston rod 14. This is important from the standpoint of preventing galling of the piston rod by the piston shaft. Other features of the invention are, as set forth above, considered to reside in the compactness and sturdiness of the hoist in general, the mechanism for obtaining the optimum in lift and speed ratio, the use of the connector 15 and other advantages that will appear from the foregoing description. Further features and objects, not categorically enumerated herein, will undoubtedly occur to those versed in the art, as will many modifications and alterations in the preferred embodiment disclosed, all of which may be achieved without departing from the spirit and scope of the invention. In the specification, as well as in the claims, expressions such as "front," "rear," etc., have been used in the interests of convenience and are not words of limitation, since the components may obviously have other directional and positional relationships without sacrificing the principles of the invention.

What is claimed:

1. A hoist for a vehicle having a fore-and-aft main frame and a body pivoted to the rear end of the frame for upward and rearward tilting, said hoist comprising: a pair of transversely spaced apart bars extending fore-and-aft and pivoted at their front ends to a front part of the main frame on a transverse axis below the body, said bars normally extending generally horizontally and having their rear ends cross-connected by a first transverse pivot shaft; a link pivoted at one end to the first pivot shaft and extending normally upwardly and rearwardly and having at its other end a second transverse pivot shaft; a pair of transversely spaced apart fore-and-aft extending lift arms having their rear ends connected to the second pivot shaft and normally extending forwardly below the body and above the bars and having their front ends pivotally connected to the body above the pivot of the bars, each of said arms having an under edge portion engaging the first pivot shaft from above to limit the downward movement of said arms; and an extensible force-exerting device connected at its front end to the main frame adjacent to the pivot of the bars and connected at its rear end to the arms by a cross pin above both the first pivot shaft and the second pivot shaft and ahead of the second pivot shaft whereby the rate of lift of the body increases as the body lifts.

2. The invention defined in claim 1, in which: the link is in the form of a plate having a width on the order of the transverse spacing between the bars, and said plate has rigid thereon at one end a first transverse sleeve receiving the first pivot shaft and at its other end a second transverse sleeve receiving the second pivot shaft, said first sleeve having a length equal to the spacing between the bars and serving to constrain the bars and link against relative transverse displacement and said second sleeve having a length equal to the spacing between the arms and serving as a spacer therefor.

3. The invention defined in claim 1, in which: the force-exerting device is a cylinder and piston assembly including a fore-and-aft piston rod having its free end proximate to the cross pin; and a T-shaped connector connects the free end of the piston rod to the cross pin, said connector including a transverse sleeve portion receiving the cross pin and a fore-and-aft sleeve portion rigid with the transverse sleeve portion and receiving the free end of the piston rod, said transverse sleeve portion being of a length equal to the spacing between the arms and serving as a spacer therefor.

4. A hoist for a vehicle having a fore-and-aft main frame and a body pivoted to the rear end of the frame for upward and rearward tilting, said hoist comprising: mounting means affixable to a front part of the frame below the body and including a pair of transversely spaced apart and lined bearings; a transverse pivot member having opposite ends journaled in the bearings; a pair of fore-and-aft transversely spaced apart bars connected at their front ends to the pivot member respectively laterally adjacent the bearings and normally extending generally horizontally below the body and having their rear ends cross-connected by a first transverse pivot shaft; a link pivoted at one end to the first pivot shaft and extending normally upwardly and rearwardly and having at its other end a second transverse pivot shaft; a pair of transversely spaced apart fore-and-aft extending lift arms having their rear ends connected to the second pivot shaft and normally extending forwardly below the body and above the bars and having their front ends pivotally connected to the body above the aforesaid pivot member; an extensible cylinder and piston assembly lying lengthwise between the arms with the closed end of the cylinder adjacent to the pivot member and the free end of the piston adjacent to the link; means connecting the closed end of the cylinder to the pivot member; and means including a cross pin connecting the free end of the piston rod to the arms on an axis above the first pivot shaft, the longitudinal axis of said piston rod always being disposed above said first and second pivot shafts.

5. The invention defined in claim 4, in which: the means connecting the closed end of the cylinder to the pivot member comprises a cross bar parallel to and rigidly secured to the pivot member between the bearings and a bracket on said cross bar and secured to the cylinder.

6. A hoist for a vehicle having a fore-and-aft main frame and a body pivoted to the rear end of the frame for upward and rearward tilting, said hoist comprising: a fore-and-aft bar rockably mounted at its front end to a front part of the main frame on a transverse axis below the body, said bar normally extending generally horizontally and having at its rear end a first transverse pivot; a link pivoted at one end to the first pivot and extending normally upwardly and rearwardly and having at its other end a second transverse pivot; a fore-and-aft extending lift arm having its rear end connected to the second pivot and normally extending forwardly below the body and above the bar and having its front end pivotally connected to the body above the rockable mounting of the bar; and an extensible force-exerting device connected at its front end to the main frame adjacent to the pivot of the bar and connected at its rear end to the arm by a cross pin above the first pivot and ahead of the second pivot whereby the rate of lift of the body constantly increases as the body lifts.

References Cited in the file of this patent
UNITED STATES PATENTS

| | | |
|---|---|---|
| 2,226,213 | Wood | Dec. 24, 1940 |
| 2,698,199 | Godbersen | Dec. 28, 1954 |